(12) United States Patent
Furuskär et al.

(10) Patent No.: US 7,245,922 B2
(45) Date of Patent: Jul. 17, 2007

(54) METHOD AND APPARATUS FOR CONTROLLING QUALITY OF SERVICE FOR MULTIPLE SERVICES THROUGH POWER SETTING

(75) Inventors: Anders Furuskär, Stockholm (SE); Magnus Almgren, Sollentuna (SE); Christer Johansson, Solna (SE); Peter de Bruin, Gammelstad (SE); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1441 days.

(21) Appl. No.: 09/899,242

(22) Filed: Jul. 6, 2001

(65) Prior Publication Data

US 2002/0102984 A1    Aug. 1, 2002

Related U.S. Application Data

(63) Continuation-in-part of application No. 09/774,563, filed on Feb. 1, 2001, now abandoned.

(51) Int. Cl.
  *H04Q 7/20* (2006.01)
(52) U.S. Cl. ............... 455/453; 455/452.1; 455/452.2; 455/67.11
(58) Field of Classification Search ............... 455/450, 455/447, 452.1, 452.2, 453, 423, 464, 501, 455/509, 67.11, 67.13, 1, 512, 520, 522, 69, 455/134, 135
See application file for complete search history.

(56) References Cited

U.S. PATENT DOCUMENTS 6,456,844 B1 *  9/2002  Parantainen et al. ........ 455/423
6,504,820 B1 *  1/2003  Oliva ........................ 370/232
6,710,702 B1 *  3/2004  Averbuch et al. ........... 370/347

FOREIGN PATENT DOCUMENTS

WO      WO 00/19760    *  4/2000
WO         00/49824       8/2000

OTHER PUBLICATIONS

W W S Wong et al. "Power Assignment Strategies and Traffic Control for Wireless Multimedia DS-CDMA Systems" Seventh IEEE International Symposium on Personal, Indoor and Mobile Radio Communications. PIMRC' 96; Tapei, Taiwan. Proceedings of PIMRC' 96, vol. 1, Oct. 15, 1996, pp. 188-192.

Bernardi De R et al., "Load Control Strategies for Mixed Services in WCDMA", VTC 2000-Spring. 2000 IEEE 51st. Vehicular Technology Conference Proceedings. Tokyo, Japan, May 15-18, 2000, IEEE Vehicular Technology Conference, NY, NY: IEEE, US, vol. 2 of 3, Conf. 51, May 15, 2000, pp. 825-829.

* cited by examiner

*Primary Examiner*—Edward F. Urban
*Assistant Examiner*—John J. Lee
(74) *Attorney, Agent, or Firm*—Roger S. Burleigh

(57) ABSTRACT

A method and apparatus provides for control of the quality of service for service groups by controlling the power of each service group. The carrier-to-interference requirements for which each service group achieves its minimum acceptable link quality is determined. The difference in carrier-to-interference requirements due to different requirements of fractions of satisfied users is compensated for. A power offset between the service group is determined using the compensated carrier-to-interference requirements.

55 Claims, 3 Drawing Sheets

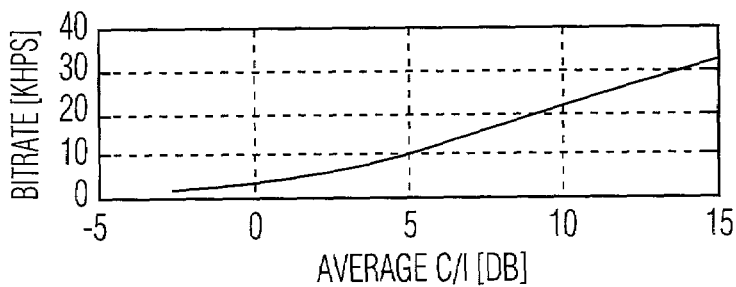
FIG. 3A
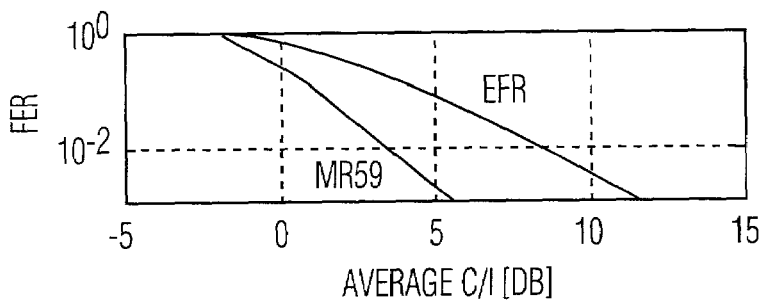
FIG. 3B
| VOICE QUALITY AND C/I REQUIREMENT | INTERACTIVE DATA QUALITY (PER TS) AND C/I REQUIREMENT | 5TH – 10TH PERCENTILE DIFFERENCE | POWER OFFSET |
|---|---|---|---|
| EFR 1% FER 8dB C/I | 10 KBPS/5dB | | 8-5+3=6dB |
| | 15 KBPS/7dB | | 8-7+3=4dB |
| | 20 KBPS/9dB | 3dB | 8-9+3=2dB |
| MR59 0.6% FER 4dB C/I | 10 KBPS/5dB | | 4-9+3=2dB |
| | 15 KBPS/7dB | | 4-9+3=0dB |
| | 20 KBPS/9dB | | 4-9+3=-2dB |
FIG. 4

METHOD AND APPARATUS FOR CONTROLLING QUALITY OF SERVICE FOR MULTIPLE SERVICES THROUGH POWER SETTING

This application is a continuation-in-part of U.S. patent application Ser. No. 09/774,563 to Furuskär et al. filed on Feb. 1, 2001 now abandoned, the entire disclosure of which is herein expressly incorporated by reference.

BACKGROUND

The present invention relates to quality of service control in networks, and more specifically, to controlling quality of service for multiple services in a radio network through service group power setting.

Due to the rising popularity of data services such as the Internet, there has been an increased demand for various types of access to these data services. To address this increased demand for access to data services, operators of radio networks have implemented techniques for communication of data through the radio networks. Many portions of the conventional radio networks are reused for these data services. Accordingly, the radio network's air interface resources are shared between the voice and data services. It will be recognized that, depending on the radio access technique, a resource consists of a set of logical or physical channels, (e.g., frequencies for FDMA, timeslots for TDMA, or spreading codes for CDMA), together with a constraint on maximum power or energy for use on these logical or physical channels. When managing the common resource for multiple services in a radio network, bearers of different services having different requirements on channel availability and channel quality, stemming from, e.g., co-channel interference from other cells, should be accounted for.

P. Stuckman et al. "GPRS Radio Network Capacity and Quality of Service Using Fixed and On-Demand Channel Allocation", in proc IEEE VTC'00 Spring, which is herein expressly incorporated by reference, discloses one conventional method for managing different services in a radio network by dividing the common resource set into smaller isolated parts. Each of these smaller isolated parts are reserved specifically for one service group. Accordingly, channel availability per service group can be controlled through the amount of resources allocated to a particular subset. Channel quality may also be controlled if the resources are arranged such that the same subset allocation is used in all cells in the radio network. Using the same subset allocation in all of the cells in a radio network avoids interference between more aggressive and less aggressive service groups because equally aggressive services will be allocated on the same co-channels in neighboring cells. However, dividing the common resource set into smaller isolated parts results in trunking losses due to the fact that the fewer resources that are pooled together, the less effective each individual resource becomes. Dividing the common resource set requires service mix dependent dimensioning which is difficult to determine prior the division of the common resource set.

One method for managing a common resource for multiple services which avoids the above-identified trunking losses, is to mix services on this same resource. When services are mixed on the same resource, channel availability may be controlled through priority schemes, e.g., assigning blocking sensitive voice services priority over less delay-sensitive data services. For more information on mixing services on the same resource the interested reader should refer to G. Bianchi et al., "Packet Data Services Over GSM Networks With Dynamic Stealing Of Voice Channels", Proceedings of IEEE GLOBECOM 1995, which is herein expressly incorporated by reference. Because different services typically have different channel quality requirements there are many deficiencies with mixing services on the same resource. For example, when different services are mixed on the same resource the average interference situation on the shared channels is the same regardless of service type. Accordingly, without first accounting for this interference situation, mixing different services on the same resource does not account for the different channel quality requirements of different services.

One method for adjusting the allocation of resources for different quality requirements can be achieved through individual power control. Individual power control is currently used in most direct sequence-CDMA (DS-CDMA) systems, e.g., wide band CDMA (WCDMA), IS-95 or CDMA-2000, as well as TDMA-based systems, e.g., GSM/EDGE systems. In general, individual power control is used to control the power at which individual mobiles or base stations transmit in order to minimize mutual interference between the mobiles or base stations. Since an increase in transmit power for one mobile or base station increases interference to other mobiles or base stations within radio range, this increased transmit power can be considered as increasing the radio resources allocated to the mobile or base station, while the increased interference decreases the radio resources allocated to the other mobiles or base stations. The intent of individual power control is to limit a mobile or base station to transmitting at a minimum power level required to respectively reach a base station or mobile station, with a desired signal strength or quality. For more information on how individual power control can be used as a component to manage multiple services, the interested reader should refer to D. Imbeni et al., "Quality of Service Management for Mixed Service in WCDMA", in proc IEEE VTC'00 Fall, which is herein expressly incorporated by reference.

One problem with individual power control in GPRS/EGPRS systems is that the amount of individual power control is limited by current standards. Further, in combination with the limited power control provided by the standards, the short duration of data packets for the power control algorithms to converge within renders channel qualities difficult to control through power control. In addition, since these individual power control schemes dynamically regulate power individually for each user to achieve a given link quality target, an increased amount of signaling in the network is required.

Accordingly, it would be desirable to control the quality of service for multiple services that share a common resource without trunking losses and service mix dependent dimensioning. Further, it would be desirable to provide different quality requirements for different services. In addition, it would be desirable to control the interference between service groups to maximize capacity without the increased complexity of individual power control.

SUMMARY

A method and apparatus provides for control of the quality of service for service groups by controlling the power of a set of users using a common service, which can be referred to as a service group. The quality of service to be provided to each service group is determined. The carrier-to-interference ratio requirements for which each service group meets the minimum acceptable quality of service is determined. A power offset between the service groups is determined using the determined carrier-to-interference ratios. In accordance with further embodiments of the present invention the carrier-to-interference level at which the required percentage of users of each service group achieve the minimum acceptable quality of service level is compensated for. The power offset between the groups is determined using the compensated carrier-to-interference levels. In accordance with one aspect of the present invention, the allocation of radio resources can include admission/load control based on the total amount of radio resources allocated either per base station or for a group of base stations.

BRIEF DESCRIPTION OF THE DRAWINGS

The objects and advantages of the invention will be understood by reading the following detailed description in conjunction with the drawings, in which:

FIG. 3A illustrates the bearer quality versus link quality for an exemplary EGPRS interactive data bearer in accordance with exemplary embodiments of the present invention;

FIG. 3B illustrates the bearer quality versus link quality for the MR59 and EFR voice bearers in accordance with exemplary embodiments of the present invention;

FIG. 4 illustrates a chart used for determining the power offset between voice and interactive data bearers.

DETAILED DESCRIPTION

Figure 1:
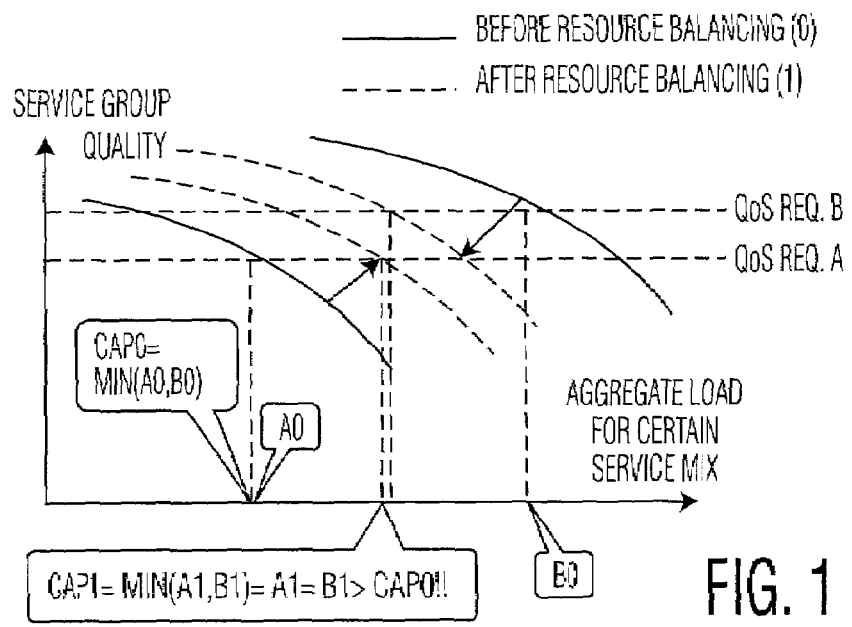
FIG. 1 illustrates the service group quality versus the aggregate load for a certain service group mix.

The various features of the invention will now be described with reference to the figures, in which like parts are identified with the same reference characters.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention.

According to exemplary embodiments of the present invention, to maximize capacity for a mix of service groups, service-based power control is implemented. Specifically, the present invention uses a static, or semi-static, power offset, or attenuation, between bearer service groups which is applied to either the fixed, maximum or initial power levels for all transmissions associated with a particular service group.

In accordance with exemplary embodiments of the present invention, in a multiple service group environment capacity for the service group mix can be maximized by reallocation of resources from service groups with an excess quality to service groups which are barely achieving their quality requirements. FIG. 1 illustrates the service group quality versus the aggregate load for a certain service group mix. Assume that capacity for a certain service mix in multiple service systems is the maximum aggregate load for which all services' quality requirements are sustained. Aggregate load may, e.g., be defined as the total number of users together with the fractions of users of the different services, i.e., the service mix.

Service quality requirements may be expressed in two steps: first as a service group quality measure, e.g., in terms of a certain fraction of satisfied users of a service; and second as individual user quality, often simply denoted Quality-of-Service (QoS), e.g., in terms of a certain minimum voice quality or exceeding a certain data-rate. As illustrated in FIG. 1, the aggregate load (A0) at which the group quality for the first, i.e., worst or most sensitive, service (Service A) fails to meet its quality requirements limits the capacity (Cap 0) for this service mix. The fact that the second service group (Service B) may maintain acceptable quality for a higher load (B0) does not address this capacity limit for the service mix. Nor does the fact that the second service group, at the capacity limit, experiences a better quality than required.

The way to improve the system capacity in this case is thus to improve the performance for the most sensitive service (Service A). This may be done on behalf of the available radio resource for the service group with excessive quality (Service B). The effect of this resource balancing is depicted by arrows moving the quality vs. load curves upwards for service A and downwards for service B. The curves are moved until the quality requirements are simultaneously reached for the first and second service groups. As illustrated in FIG. 1, the quality requirements for the first and second service groups are simultaneously achieved when both service groups just meet their quality requirements, i.e., at Cap 1=min(A1,B1). Any deviation from this capacity would cause either of the curves to move downwards-left, and thereby limit the capacity to a lower value than Cap 1.

The techniques described above can be extended to situation with more than two service groups. For example, initially resources from the set of services with excessive quality are allocated to the most sensitive service. The system capacity can be improved using this technique until another service becomes the limiting one. Then this new limiting service is allocated resources from the set with excessive quality. This process can be repeated until no service has excessive quality and all services will just barely meet their corresponding requirements. At this point the system capacity is maximized.

Hence, managing radio resources so that all service groups simultaneously reach their quality requirements maximizes system capacity. Note that the limiting services may well differ with the service mix and thus require service mix-adaptive management schemes.

Figure 2:
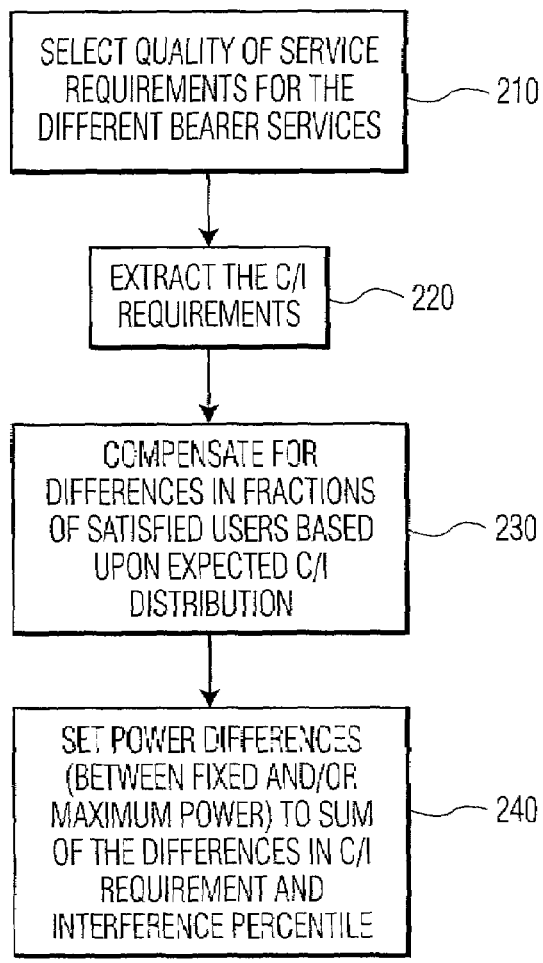
FIG. 2 illustrates an exemplary method for achieving service-based power setting in accordance with the present invention.

In accordance with exemplary embodiments of the present invention, the allocation of radio resources between service groups is achieved through per bearer service-based power setting for each service group. The difference in link quality for each bearer of each service group is based upon the output power allocated to each service group. FIG. 2 illustrates an exemplary method for achieving service-based power setting in accordance with the present invention. Initially, the quality of service requirements for each of the different bearer services, i.e., service groups, is selected (step 210). The carrier-to-interference requirements for which each service group achieves its minimum acceptable link quality is determined (step 220).

It will be recognized that most telecommunication systems are not designed to provide all of the users with an acceptable link quality all of the time. Instead, many telecommunications systems consider it acceptable if only a certain percentage of the total number of users, e.g., 95%, achieve an acceptable link quality. Further, this fraction may differ between services. If the fractions differ between services the power requirements for each service group is compensated, using an expected carrier-to-interference distribution, to account for the fractions of satisfied users for the telecommunication system (step 230). The power differences between service groups is then determined as a sum of the difference in carrier-to-interference requirements and the difference in carrier-to-interference requirements due to different fractions (percentages) of satisfied users (step 240). The power offset can be applied to a fixed power per bearer for a service group. Alternatively, if the system implements individual power control, the power offset can be applied to an initial power or a maximum power per bearer for a service group. In accordance with exemplary embodiments of the present invention, the power offsets determined using the method described above in connection with FIG. 2 can be repeatedly updated based upon estimates or measurements of the quality for the different service groups.

It will be recognized that at least steps 220 and 230 of FIG. 2 could be automated. In case of Step 220 this could be automated by a system which adaptively tracks what channel qualities are required for a certain service quality (e.g., through maintaining a table with the information of FIGS. 3A and 3B). In case of step 230, the quality, e.g., carrier-to-interference, difference between different fractions of the user population could be measured and based on this measurement the associated offset adapted.

Also, certain systems may be able to directly measure user quality, and thereby also the fraction of satisfied users of each service group. Such systems could directly adjust power offsets to reach the desired balance between service groups, and hence maximize capacity. Note also that the power offsets applied may differ between different regions of a network, e.g. between cells.

Now that the general operation of the present invention has been provided, an exemplary implementation of the present invention in a GSM/EDGE radio access network (GERAN) is provided to highlight the advantageous characteristics thereof. FIG. 3A illustrates the bearer quality versus link quality for an exemplary EGPRS interactive data bearer. Assume that the interactive data requirement is 10 kpbs per timeslot to achieve a minimum acceptable QoS. Referring to FIG. 3A, this requirement is met with an average carrier-to-interference ratio of 5 dB.

FIG. 3B illustrates the bearer quality versus link quality for the GERAN voice bearer: Multi rate 5.9 kbps (MR59) and Enhanced Full Rate (EFR). Assume that the voice bearer requirement of an EFR voice bearer is a 1% frame error rate (FER) to achieve a minimum acceptable QoS. As illustrated in FIG. 3B, this requirement is met with an average carrier-to-interference ratio of 8 dB. Accordingly, a system which mixes EGPRS interactive data bearers and EFR voice bearers would uses a power offset of 3 dB, i.e., 8 dB for the EFR voice bearers minus 5 dB for the EGPRS interactive data bearers. Accordingly, a system which implements the present invention would set the power for the EGPRS interactive data bearers 3 dB below the power used for the EFR voice bearers.

Assume now that a system provides a service mix of MR59 voice bearers and EGPRS data bearers. Further assume that the voice bearer quality of the MR59 voice bearers is 0.6% FER. Referring now to FIG. 3B, this FER is achieved at an average carrier-to-interference ratio of 4 dB. Accordingly, the system which provides a service mix of MR59 voice bearers and EGPRS data bearers would set the EGPRS interactive data bearers 1 dB above the power used for MR59 voice bearers, i.e., 4 dB for MR59 voice bearers minus 5 dB for the EGPRS interactive data bearers.

It should be noted that the techniques described above can also be applied to control quality for bearers of the same service type but with different quality requirements. Assume, for example, that two different interactive data service groups are to be statistically, e.g., based on a certain percentile of users, provided with 10 kbps and 20 kbps, respectively. According to FIG. 3A, for achieving the desired system behavior, a power offset between the bearers of the two groups should be 4 dB, i.e., 9 dB–5 dB, should be implemented between the two service groups wherein the higher power is used for the 20 kbps service group. Another example may be two different voice service groups, a first with MR59 bearers and a required FER of 0.6% and a second with EFR bearers and a required FER of 1.0%. In this case the power offset of 4 dB, i.e., 8 dB–4 dB, should be used to achieve the desired system behavior wherein the higher power is used for the EFR bearers.

FIG. 4 illustrates a chart used for determining the power offset between voice and interactive data bearers. The first column is a measure of the voice quality and carrier-to-interference requirement for EFR and MR59 voice bearers. The second column is a measure of the interactive data quality per timeslot and carrier-to-interference requirements for an EGPRS data bearer. The third column is a measure of the difference in power between 95% satisfied users and 90% satisfied users, i.e., the $5^{th}$–$10^{th}$ percentile difference. The fourth column contains a calculation of the required power offset in a system which mixes EFR voice bearers and EGPRS data bearers or MR59 voice bearers and EGPRS data bearers when the EGPRS data bearers only require 90% of the users to achieve an acceptable minimum level of quality of service.

It will be recognized that the $5^{th}$–$10^{th}$ percentile difference can be estimated using typical or expected interference distributions. For example, in a 1/3 or 3/9 reuse system without power control the difference between the $5^{th}$ and $10^{th}$ percentile of carrier-to-interference ratio is approximately 3 dB. This difference can also be derived with statistical functions if the distribution is known. For example, if the carrier-to-interference is normal distributed the standard deviation by itself defines the differences between any percentile values. It is then only necessary to estimate or measure the carrier-to-interference standard deviation, i.e., (standard deviation*X1)–(standard deviation*X2), wherein X1 and X2 are respectively the higher and lower percentiles. For example, with a standard deviation of 10 dB, the difference between 5th percentile and 10th percentile (10*1.64)–(10*1.28)=3.6 dB, and between 1st and 20th percentile (10*2.33)–(10*0.084)=14.9 dB. The values X=1.64, 1.28 and 0.84 respectively are achieved from the inverse normal distribution function for fi(X)=0.95 ($5^{th}$ percentile), 0.9 ($10^{th}$ percentile), 0.99 ($1^{st}$ percentile) and 0.8 ($20^{th}$ percentile).

Figure 5:
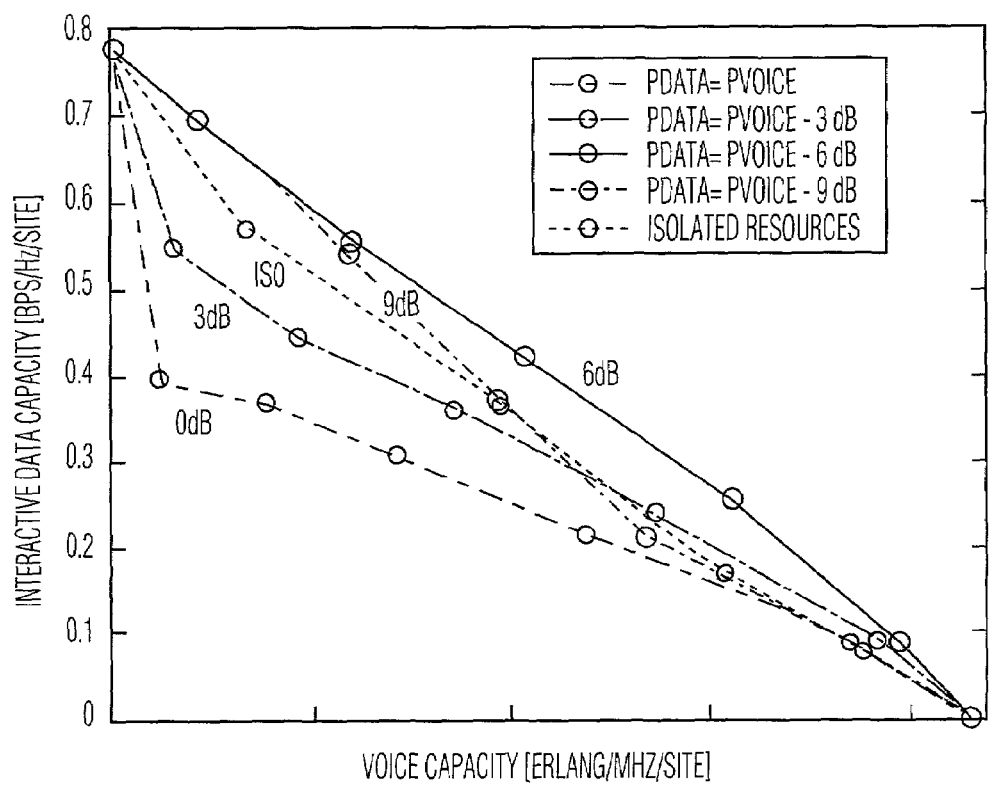
FIG. 5 illustrates the joint voice and interactive data capacity for different mixes of voice and data traffic in a GSM/EDGE system.

FIG. 5 illustrates the joint voice and interactive data capacity for different mixes of voice and data traffic in a GSM/EDGE system. For each service group mix, the capacity is evaluated in a manner similar to that described above in connection with FIG. 1 and is represented in FIG. 5 by a point on one curve marked with an 'o'. The areas below the curves in FIG. 5 correspond to feasible loads for all traffic mixes for voice and data traffic. Specifically, FIG. 5 illustrates the capacity using isolated bearers, Iso, and for bearers with a 0 dB, 3 dB, 6 dB and 9 dB power offset in accordance with the present invention. As can be seen from FIG. 5, a power offset of 6 dB provides the greatest capacity for the voice and data service mix. As also illustrated in FIG. 5, the 6 dB offset in accordance with the present invention provides a greater capacity for the voice and data service group mix than using isolated bearers.

It should be recognized that the example described above is intended to be illustrative of the implementation of the present invention in one type of system and is not intended to limit the application of the present invention. For example, the present invention can also be used when a streaming bearer is transmitted in the service group mix. In addition, power offsets can be determined in a system where more than two different bearers are used in a service group mix. It should also be recognized that the present invention is not intended to replace individual power control used in radio systems. Instead the present invention can be used to complement these individual power control schemes to achieve a maximum aggregate load for certain service mix.

In accordance with further embodiments of the present invention, per bearer service group power control can be complemented by other resource allocation techniques. For example, per bearer service group power control can be used in connection with resource scheduling and/or channel allocation schemes.

One such resource scheduling scheme is admission/load control. Admission/load control schemes are designed to balance the load on the radio communication system versus the interference caused by communications between mobiles and base stations in the system. Conventional admission/load control schemes strike this balance based upon a predetermined number of users. However, depending upon the amount of power used by communications between base stations and mobile stations, the number of users may not be an accurate measure of the amount of interference in the radio communication system. In accordance with one aspect of the present invention, the total output power of the users who have been admitted to communicate with the radio communication system is measured to determine whether there is sufficient capacity to admit a new user into the radio communication system. The same principle can also be applied to determine if dropping of users from the system is necessary. Further, a different threshold can be employed for determining whether to admit new users then for determining whether to drop users. Since different power levels are employed in a radio communication system in accordance with the present invention, employing admission control based upon the total amount of power employed by the radio communication system provides a more accurate measure of the total interference compared to based upon the number of admitted users. The admission control/load control scheme in accordance with one aspect of the present invention can allow admitting users until the total power per base station exceeds a certain limit. In accordance with another aspect of the present invention, a measure of the interference can be based upon the total amount of power of a set of base stations. Although the admission control example described above uses total output power to make admission decisions, the present invention can also employ other functions of the admitted users' powers such as a sum of the powers or a weighted sum of the powers with service dependent weights.

Although exemplary embodiments of the present invention have been described above as compensating for a percentage of satisfied users, the present invention can be implemented to compensate for any statistical function of user quality within a service group. Further, although exemplary embodiments of the present invention have been described wherein carrier-to-interference is used as a measurement of QoS, the present invention can be implemented using other types of measurements of radio channel quality, e.g., Bit Error Probability (BEP), Bit Error Rate (BER), Frame Erasure Rate (FER), Block Error Rate (BLER), etc.

The invention has been described herein with reference to particular embodiments. However, it will be readily apparent to those skilled in the art that it may be possible to embody the invention in specific forms other than those described above. This may be done without departing from the spirit of the invention. Embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for allocating radio resources in a radio communication system comprising the steps of:
    selecting a service quality requirement for a first service group and a second service group;
    determining an amount of radio resources for the first and second service groups to achieve the respective service quality requirement; and
    allocating the radio resources between the first and second service groups based on a difference between the determined amount of radio resources, wherein the radio resources are allocated per bearer within the first and second service groups;
    wherein the amount of radio resources is based on a power level used for the first and second service groups and the difference between the determined amount of radio resources is a difference in power between the first and second service groups;
    wherein the amount of radio resource is further based on the scheduling to the first and second service group such that the amount of channel used by each service group is controlled by the scheduling.

2. The method of claim 1, wherein the determined amount of radio resources is a relative amount of radio resources between the first and second service groups.

3. The method of claim 1, wherein the determined amount of radio resources is an absolute amount of radio resources for the first and second service groups.

4. The method of claim 1, wherein said service quality is a function of user quality, within the service group.

5. The method of claim 4, further comprising the step of:
    compensating the amount of radio resources for the first and second service groups based upon a percentage of users of the first and second service groups which is desired to achieve the quality of service requirement, wherein the radio resources are allocated based upon the compensated amount of radio resource.

6. The method of claim 5, wherein the compensation is based on the carrier-to-interference ratio standard deviation.

7. The method of claim 5, wherein the percentage of users of the first and second service groups who can achieve the quality of service requirement is measured and the amount of radio resources is adaptively compensated for based upon the updated percentage of users of the first and second service groups.

8. The method of claim 4, wherein the quality of service requirements is measured or estimated by carrier-to-interference ratios, bit error probability, bit error rate, frame erasure rate or block error rate.

9. The method of claim 1, wherein the difference in power between the first and second service groups is applied to a fixed output power of the first service group.

10. The method of claim 1, wherein the difference in power between the first and second service groups is applied to a maximum power for the first service group.

11. The method of claim 1, wherein the difference in power between the first and second service groups is applied to an initial power for the first service group.

12. The method of claim 1, wherein the difference in power between the first and second service groups is applied to a fixed power, a maximum power and an initial power for the first service group.

13. The method of claim 1, further comprising the step of:
adjusting the power for individual users of a service group using individual power control loops.

14. The method of claim 1, wherein the amount of radio resource is further based on the number of channels allocated to the first and second service group.

15. The method of claim 1, wherein the step of allocating the radio resources further comprises the steps of:
calculating a sum of the total power for all users in the radio communication system; and
admitting new users to the radio communication system if the sum is less than a predetermined threshold.

16. The method of claim 15, further comprising the step of:
dropping users from the radio communication system if the sum is greater than another predetermined threshold, wherein the radio communication system includes at least two base stations.

17. The method of claim 15, wherein the radiocommunication system is a GSM/EDGE radio access network (GERAN).

18. The method of claim 1, wherein the step of allocating the radio resources further comprises the steps of:
calculating a function of the power for all users in the radio communication system; and
admitting new users to the radio communication system if the calculated function is less than a predetermined threshold.

19. The method of claim 18, further comprising the step of:
dropping users from the radio communication system if the calculated function is greater than another predetermined threshold, wherein the radio communication system includes at least two base stations.

20. The method of claim 1, wherein the step of allocating the radio resources further comprises the steps of:
calculating a weighted sum of the power for all users in the radio communication system; and
admitting new users to the radio communication system if the weighted sum is less than a predetermined threshold.

21. The method of claim 20, further comprising the step of:
dropping users from the radio communication system if the weighted sum is greater than another predetermined threshold, wherein the radio communication system includes at least two base stations.

22. The method of claim 1, wherein the radio communication system includes a base station, the step of allocating radio resources further comprises the steps of:
calculating a sum of the total power for all users communicating with the base station;
admitting new users to the base station if the sum is less than a predetermined threshold; and
dropping users from the base station if the sum is greater than the predetermined threshold.

23. The method of claim 1, wherein the selecting step and the determining step are continuously performed to provide an updated allocation of radio resources.

24. The method of claim 1, wherein the selecting, determining and allocating steps are performed for the first service group, the second service group and a third service group.

25. A method of allocating radio resources for a first and second service group comprising the steps of:
determining an amount of radio resources at which the first service group can provide an minimum quality of service level;
determining an amount of radio resources allocated for the second service group;
reallocating radio resources proportionally from the second service group to the first service group such that the service quality limits are simultaneously met;
determining an amount of radio resources at which a third service group can provide an minimum quality of service level;
determining an amount of radio resources allocated for a third service group; and
reallocating radio resources from the fourth service group to the third service group such that the total load between the first, second, third and fourth service groups is maximized.

26. The method of claim 25, wherein the radio resources are reallocated to maximize capacity.

27. The method of claim 25, wherein the radio resources are an output power for the first and second service groups.

28. The method of claim 27, wherein the radio resources are further a channel allocation for the first and second service groups.

29. The method of claim 27, wherein the output power for the first and second service groups is a per bearer output power for the first and second service groups.

30. The method of claim 27, wherein the output power is an initial power for the service group.

31. The method of claim 27, wherein the output power is a maximum power for the service group.

32. The method of claim 27, wherein the output power is a fixed power for the service group.

33. A radio communication system comprising:
means for selecting a service quality requirement for a first service group and a second service group, wherein said service quality is a function of user quality, within a service group;
means for determining an amount of radio resources for the first and second service groups to achieve the respective service quality requirement; and
means for allocating the radio resources between the first and second service groups based on a difference between the determined amount of radio resources, wherein the radio resources are allocated per bearer within the first and second service groups;
means for compensating the amount of radio resources for the first and second service groups based upon a percentage of users of the first and second service groups which is desired to achieve the quality of service requirement;
wherein the radio resources are allocated based upon the compensated amount of radio resource; and,
wherein the percentage of users of the first and second service groups who can achieve the quality of service requirement is measured and the amount of radio resources is adaptively compensated for based upon the updated percentage of users of the first and second service groups.

34. The system of claim 33, wherein the determined amount of radio resources is a relative amount of radio resources between the first and second service groups.

35. The system of claim 33, wherein the determined amount of radio resources is an absolute amount of radio resources for the first and second service groups.

36. The system of claim 33, wherein the quality of service requirements is measured or estimated by carrier-to-interference ratios, bit error probability, bit error rate, frame erasure rate or block error rate.

37. The system of claim 33, wherein the compensation is based on the carrier-to-interference ratio standard deviation.

38. The system of claim 33, wherein the amount of radio resources is based on a power level used for the first and second service groups and the difference between the determined amount of radio resources is a difference in power between the first and second service groups.

39. The system of claim 38, wherein the difference in power between the first and second service groups is applied to a fixed output power of the first service group.

40. The system of claim 38, wherein the difference in power between the first and second service groups is applied to a maximum power for the first service group.

41. The system of claim 38, wherein the difference in power between the first and second service groups is applied to an initial power for the first service group.

42. The system of claim 38, wherein the difference in power between the first and second service groups is applied to a fixed power, a maximum power and an initial power for the first service group.

43. The system of claim 38, further comprising:
means far adjusting the power for individual users of a service group using individual power control loops.

44. The system of claim 38, wherein the amount of radio resource is further based on the number of channels allocated to the first and second service group.

45. The system of claim 38, wherein the amount of radio resource is further based on the scheduling to the first and second service group such that the amount of channel used by each service group is controlled by the scheduling.

46. The system of claim 33, wherein the system provides an updated allocation of radio resources using the means for selecting and means for determining.

47. The system of claim 33, wherein the means for selecting, determining and allocating operate in connection with the first service group, the second service group and a third service group.

48. A radio communication system for allocating radio resources for a first and second service group comprising:
means for determining an amount of radio resources at which the first service group can provide an minimum quality of service level;
means for determining an amount of radio resources allocated for the second service group;
means for reallocating radio resources proportionally from the second service group to the first service group such that the service quality limits are simultaneously met;
means for determining an amount of radio resources at which a third service group can provide an minimum quality of service level;
means for determining an amount of radio resources allocated for a third service group; and
means for reallocating radio resources from the fourth service group to the third service group such that the total load between the first, second, third and fourth service groups is maximized.

49. The system of claim 48, wherein the radio resources are reallocated to maximize capacity.

50. The system of claim 48, wherein the radio resources are an output power for the first and second service groups.

51. The system of claim 50, wherein the radio resources are further a channel allocation for the first and second service groups.

52. The system of claim 50, wherein the output power for the first and second service groups is a per bearer output power for the first and second service groups.

53. The system of claim 50, wherein the output power is an initial power for the service group.

54. The system of claim 50, wherein the output power is a maximum power for the service group.

55. The system of claim 50, wherein the output power is a fixed power for the service group.

* * * * *

UNITED STATES PATENT AND TRADEMARK OFFICE
CERTIFICATE OF CORRECTION

PATENT NO.        : 7,245,922 B2                                        Page 1 of 1
APPLICATION NO.   : 09/899242
DATED             : July 17, 2007
INVENTOR(S)       : Furuskar et al.

It is certified that error appears in the above-identified patent and that said Letters Patent is hereby corrected as shown below:

In the Drawings
In Figure 4, Sheet 2 of 3, under "POWER OFFSET", Line 5, delete "4-9+3=0dB" and insert -- 4-9+3=2dB --, therefor.

In Column 8, Line 36, in Claim 1, after "groups;" insert -- and, --.

In Column 11, Line 35, in Claim 43, delete "far" and insert -- for --, therefor.

Signed and Sealed this

Eighth Day of July, 2008

JON W. DUDAS
*Director of the United States Patent and Trademark Office*